United States Patent Office 3,076,625
Patented Feb. 5, 1963

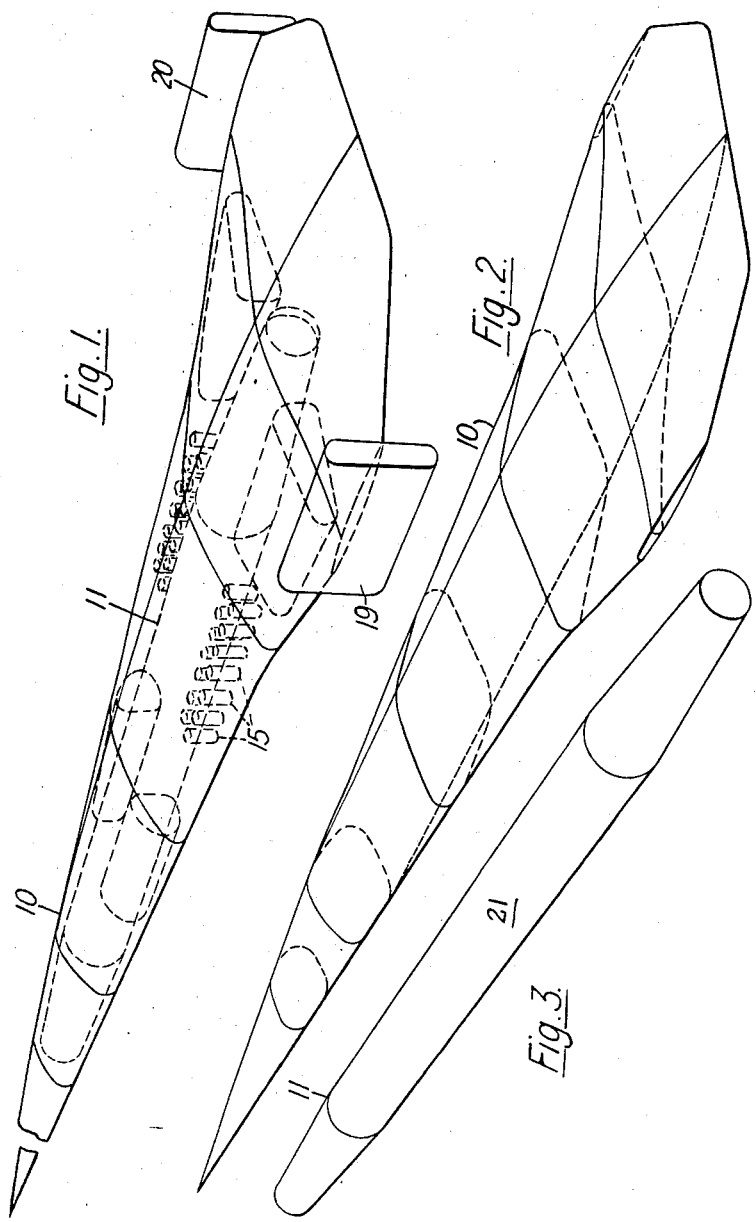

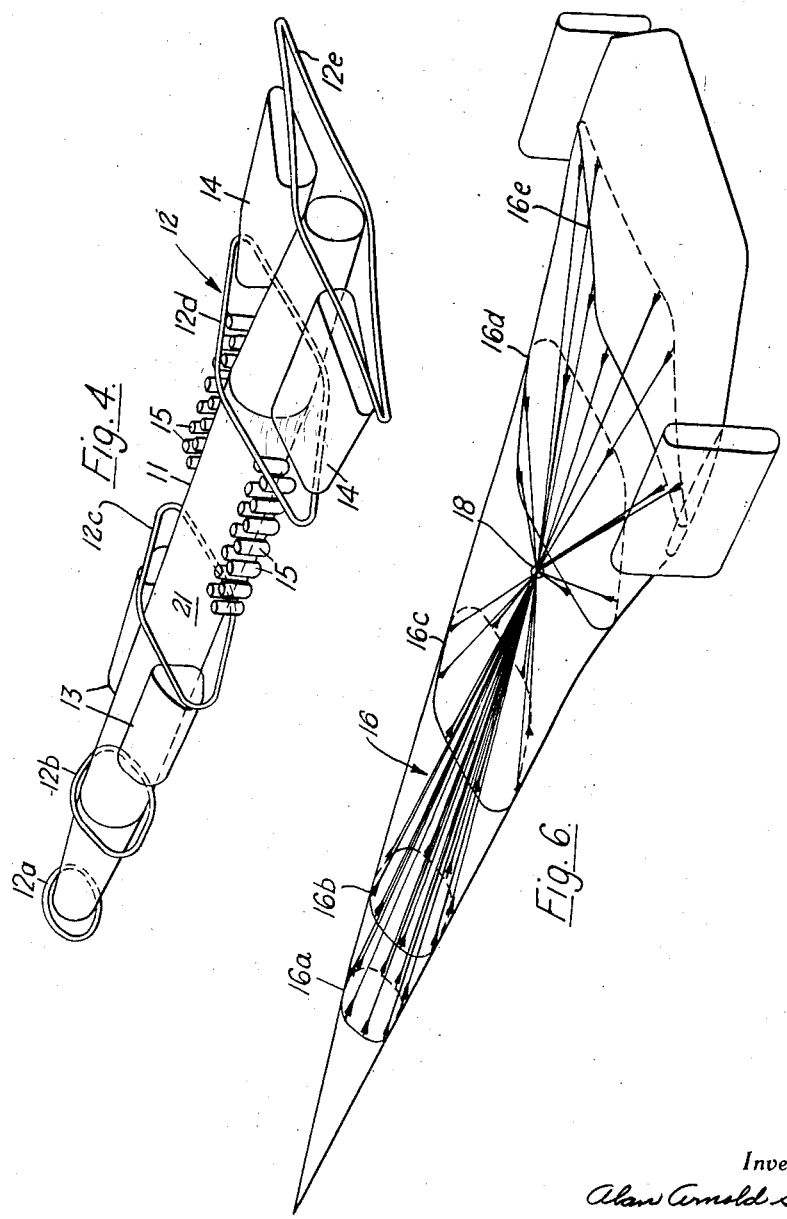

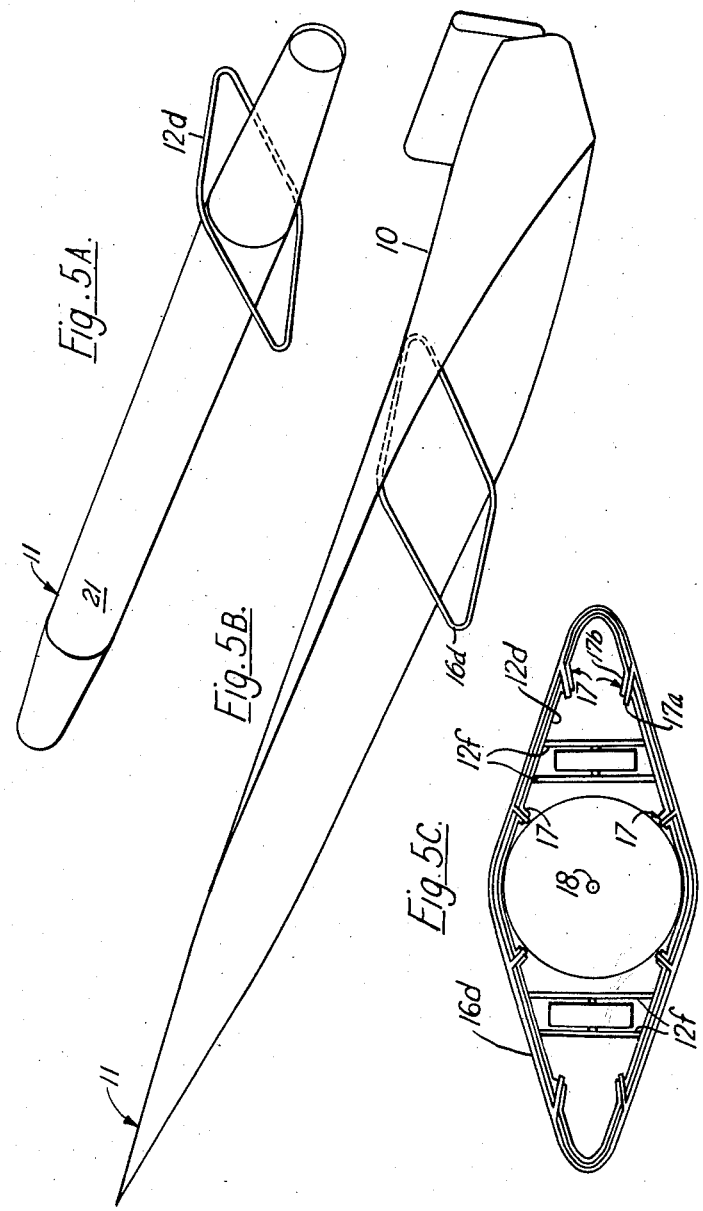

3,076,625
SUPERSONIC AIRCRAFT
Alan Arnold Griffith, Farnborough, England, assignor to Rolls-Royce Limited, Derby, Great Britain
Filed Apr. 10, 1961, Ser. No. 101,792
Claims priority, application Great Britain Apr. 12, 1960
9 Claims. (Cl. 244—117)

This invention relates to supersonic aircraft, and particularly to such aircraft designed to cruise in the region of Mach 2.

The invention particularly applies to an integrated slender wing type of supersonic transport, that is an aircraft having two essential structural elements—an external structure which defines an aerodynamic shape and an internal pressurised cabin of circular cross-section with its axis located along the root chord of the external structure. With this arrangement, a layer of insulation on the outer surface of the cabin enables the wall thereof to be maintained within a few degrees of the cabin air temperature. Hence an accelerated water tank test is sufficient to establish integrity.

According to the invention, therefore, a supersonic aircraft comprises an internal pressurised cabin mounted in a first framework, and outer skin carried by a second framework, and sliding joints interconnecting the two frameworks, all of the sliding joints being aligned towards a common center so as to permit the skin and the second framework to expand thermally with respect to the cabin and the first framework.

As a further development of this notion of a cooled internal structure, we may mount on the cabin a tubular framework which carries the fuel tanks, the lift engines and other items which have to be stowed outside the cabin. As with the cabin itself, the tubular members may be insulated on the outside and cooled internally by cabin air.

The design problem posed by this scheme is that of properly connecting the cooled internal structure to the hot outer skin. To see how this problem can be solved, let us consider two co-operating frames, attached respectively to the cabin or inner structure and the outer skin or external structure. As the skin expands thermally so also does its frame, whence it follows that only one point can remain common to both frames throughout the flight. This common center might, for instance, be at the center of gravity of the aircraft.

Now, as the outer skin expands and contracts, any point of its frame, other than the common center, moves in the other frame along the straight line joining the point of the common center. It follows that the necessary mechanical connections between the two structures can be achieved by means of sliding joints, each of which permits relative motion only to and from the direction of the common center. The outer skin is then free to expand and contract thermally but all other relative motion between it and the inner structure is prevented. The number and locations of the sliding joints may be chosen to afford proper transmission of the loading actions from one structure to the other. Moreover, the inner structure maintains the shape of the outer surface through the constraints exercised by the joints.

Preferably the common center is the center of gravity of the aircraft.

Preferably also the aircraft is of the slender wing type.

The first framework can be a tubular metal framework and can be cooled by passing coolant such as air, through the tubular framework.

The internal pressurised cabin is preferably of circular cross-section with a layer of insulation on its outer surface.

The first framework preferably carries the fuel tank and lift engines if provided.

The number and location of the sliding joints can be chosen to afford proper transmission of the loading actions from the internal structure to the external and vice versa.

The great advantage of the proposed design is that the whole of the cool inner structure can have its integrity established by an accelerated life test in conjunction with the cabin tank test. For this purpose, the appropriate wing forces are applied through the sliding joints aforesaid. The outer structure is the only part which is subject to the novel conditions of supersonic flight and cracks or other failures occurring in it can be detected by the usual service inspection routine.

If the cruising temperature and stress of the outer structure are in the region of appreciable creep, the effect of creep is to relieve the stress and transfer part of the steady cruising load to the inner structure, thereby bringing the creep to a halt. In effect, therefore, the inner structure provides the strength for cruising, whilst the outer skin makes its due contribution to stiffness and to transient strength requirements. In consequence a given material can be used at a higher cruising speed than would otherwise be possible.

One embodiment of the invention is shown in the drawings in which:

FIGURE 1 is a diagrammatic representation of an integrated slender wing type of supersonic transport aircraft;

FIGURE 2 shows one of the main structural elements of the aircraft, i.e. the external tubular structure and the skin define the external shape;

FIGURE 3 shows diagrammatically the other main structural elements i.e. the pressurised cabin of the aircraft;

FIGURE 4 shows the tubular framework built out from the cabin and carrying fuel taks and lift engines;

FIGURE 5a shows again the cabin and a part of the first frame attached to it;

FIGURE 5b shows half of the skin and one part of the second frame attached to it;

FIGURE 5c shows the two frames joined by sliding joints all of which are aligned to a common center, and FIGURE 6 shows diagrammatically the way in which all of the sliding joints joining the two frames meet at the common center.

The integrated slender wing type of supersonic transport aircraft has two essential structural elements, the external skin 10 (FIGURES 1 and 2), and an internal pressurised cabin 11 (FIGURES 1 and 3). The pressurised cabin 11 is of circular cross-section with its axis located along the root chord of the aerodynamic skin 10. The cabin has a layer of insulation 21 (FIGURES 3, 4 and 5a) on the outer surface thereof to enable the wall temperature to be maintained within a few degrees of the cabin temperature.

The first tubular framework comprising members 12a, 12b, 12c, 12d, 12e (FIGURE 4) is mounted on, and attached to the cabin 11 and is adapted to carry the fuel tanks 13 and 14 and the lift engines 15 by means of struts 12f extending between the upper and lower portions of the members 12b, 12c and 12d.

The outer skin 10 is mounted on a second framework 16 (FIGURE 5b) which has a number of members 16a, 16b, 16c, 16d, 16e shown in FIGURE 6. Each of the members 12a to 12e attached to the cabin 11, is slidably joined to the corresponding members 16a to 16e as shown in FIGURES 5c and 6.

In FIGURE 5c frames 16d and 12d are shown joined by sliding joints 17. Each of the sliding joints 17 is aligned towards a common center 18, which can be the center of gravity of the aircraft. Each sliding joint comprises a spigot 17a projecting from the frame 16d which spigot extends into a sleeve 17b formed on the frame 12d.

The outside diameter of the spigot at the bore of the sleeve are chosen so that whilst the spigot and sleeve can move axially relative to each other relative movements of the two, transverse to their axis is prevented.

The first tubular framework 12a to 12e can be cooled by supplying cold air to the inner bore of each tube. The tubes 12a to 12e can also be insulated by providing their external surface with a layer of insulating material.

As seen in FIGURE 6 all of the sliding joints are aligned on the common center 18 in all of the frameworks.

The outer skin together with the framework 16 is thus free to expand and contract thermally but all other relative motion between it and the inner structure, that is the cabin 11, is prevented.

The number and locations of the sliding joints 17 may be chosen to afford proper transmission of the loading actions from one structure to the other. The inner structure maintains the shape of the outer surface through the constraints exercised by the joints.

The remaining details of the aircraft such as the details of the lift engines 15 and banks 19 and 20 of propulsion engines can be in accordance with the arrangements set out in the United States Patent No. 2,982,501, issued May 2, 1961, to Alan Arnold Griffith and Donald Eyre.

The great advantage of the proposed design is that the whole of the cool inner structure can have its integrity established by an accelerated life test in conjunction with the cabin tank test. For this purpose, the appropriate wing forces are applied through the sliding joints aforesaid. The outer structure is the only part which is subject to the novel conditions of supersonic flight and cracks or other failures occurring in it can be detected by the usual service inspection routine.

If the cruising temperature and stress of the outer structure are in the region of appreciable creep, the effect of creep is to relieve the stress and transfer part of the steadily cruising load to the inner structure, thereby bringing the creep to a halt. In effect, therefore, the inner structure provides the strength for cruising, whilst the outer skin makes its due contribution to stiffness and to transient strength requirements. In consequence, a given material can be used at a higher cruising speed than would otherwise be possible.

What I claim is:

1. A supersonic aircraft comprising: an elongated cabin, a first framework exteriorly of and attached to said cabin at longitudinally spaced points along the same, a second framework, an outer skin mounted on said second framework and forming at least a portion of the external configuration of the supersonic aircraft, and means interconnecting said first framework and said second framework whereby said outer skin and second framework can have thermal expansion and contraction in all directions relative to said cabin, said interconnecting means including a plurality of sliding joints arranged in each of a plurality of longitudinally spaced transverse planes of the supersonic aircraft, all of said joints being slidable on axes converging on a common center within the aircraft.

2. A supersonic aircraft as claimed in claim 1 including a center of gravity, said center of gravity being coincident with said common center for the axes of all of said sliding joints.

3. A supersonic aircraft as claimed in claim 1 wherein each of said joints comprises a spigot extending from one of said first and second frameworks and a socket mounted on the other of said first and second frameworks for slidably engaging said spigot.

4. A supersonic aircraft structure as claimed in claim 1 wherein said first framework comprises tubular members through which a coolant can be passed.

5. A supersonic aircraft as claimed in claim 1 including a layer of insulating material on the outer surface of said cabin, said cabin being circular in cross-section.

6. A supersonic aircraft as claimed in claim 1 including fuel tanks supported by and within said first framework exteriorly of said cabin.

7. A supersonic aircraft as claimed in claim 1 including lift engines carried by said first framework exteriorly of said cabin.

8. A supersonic aircraft comprising: an elongated cabin, a first framework exteriorly of and attached to said cabin at longitudinally spaced points along the same, said first framework including a plurality of longitudinally spaced members, a second framework having substantially a complementary configuration of said first framework, said second framework including at least the same number of longitudinally spaced members as the members of said first framework and which correspond substantially in size and shape with respective members of said first framework and forming at least a portion of the external configuration of the supersonic aircraft, and means interconnecting said first framework and said second framework whereby said outer skin and said second framework can have thermal expansion and contraction in all directions relative to said cabin, said interconnecting means including a plurality of sliding joints arranged between corresponding members of said first and second frameworks, the sliding joints between corresponding members of said first and second frameworks being slidable on axes inclined to a plane between corresponding members and all of said joints of all of the respective corresponding members being slidable on axes converging on a single common center within the aircraft.

9. A supersonic aircraft as claimed in claim 8 wherein the common center on which all of the axes of the sliding joints converge is positioned within the aircraft in a transverse plane of the same intermediate at least two of the longitudinally spaced transverse planes of the corresponding members of said first and second frameworks.

References Cited in the file of this patent

UNITED STATES PATENTS

| | | |
|---|---|---|
| 2,967,034 | Eyre | Jan. 3, 1961 |
| 2,982,501 | Griffith et al. | May 2, 1961 |